United States Patent [19]

Nagase

[11] Patent Number: 4,512,156
[45] Date of Patent: Apr. 23, 1985

[54] GEOTHERMAL ENERGY CONVERSION SYSTEM

[75] Inventor: Ushiro Nagase, Kyoto, Japan

[73] Assignee: Kyoto Central Co. Ltd., Kyoto, Japan

[21] Appl. No.: 495,197

[22] Filed: May 16, 1983

Related U.S. Application Data

[63] Continuation-in-part of Ser. No. 213,293, Dec. 5, 1980, abandoned, which is a continuation of Ser. No. 946,977, Sep. 29, 1978, abandoned.

[30] Foreign Application Priority Data

Sep. 30, 1977 [JP] Japan ............................ 52-118146

[51] Int. Cl.³ ............................................. F03G 7/04
[52] U.S. Cl. ........................................ 60/641.2; 165/45
[58] Field of Search ................. 60/641.2, 641.3, 641.4; 165/45

[56] References Cited

U.S. PATENT DOCUMENTS

| | | | |
|---|---|---|---|
| 4,052,857 | 10/1977 | Altschuler | 165/45 X |
| 4,094,356 | 6/1978 | Ash et al. | 165/45 X |
| 4,375,831 | 3/1983 | Downing, Jr. | 165/45 X |

*Primary Examiner*—Stephen F. Husar
*Attorney, Agent, or Firm*—Townsend and Townsend

[57] ABSTRACT

Apparatus and a method for using terrestrial heat to increase the temperature of a liquid, such as water. A circulation pipe buried in the earth in a region of high subterranean heat allows the liquid to move in heat exchange relationship to the subterranean heat. The liquid is pumped from a tank adjacent to the surface of the earth and through the pipe back to the tank. The heated water in the tank can be removed from the tank and caused to flow through a heat exchanger also adjacent to the surface of the earth. Then, the water is returned to the tank for re-use and reheating.

4 Claims, 1 Drawing Figure

U.S. Patent     Apr. 23, 1985     4,512,156
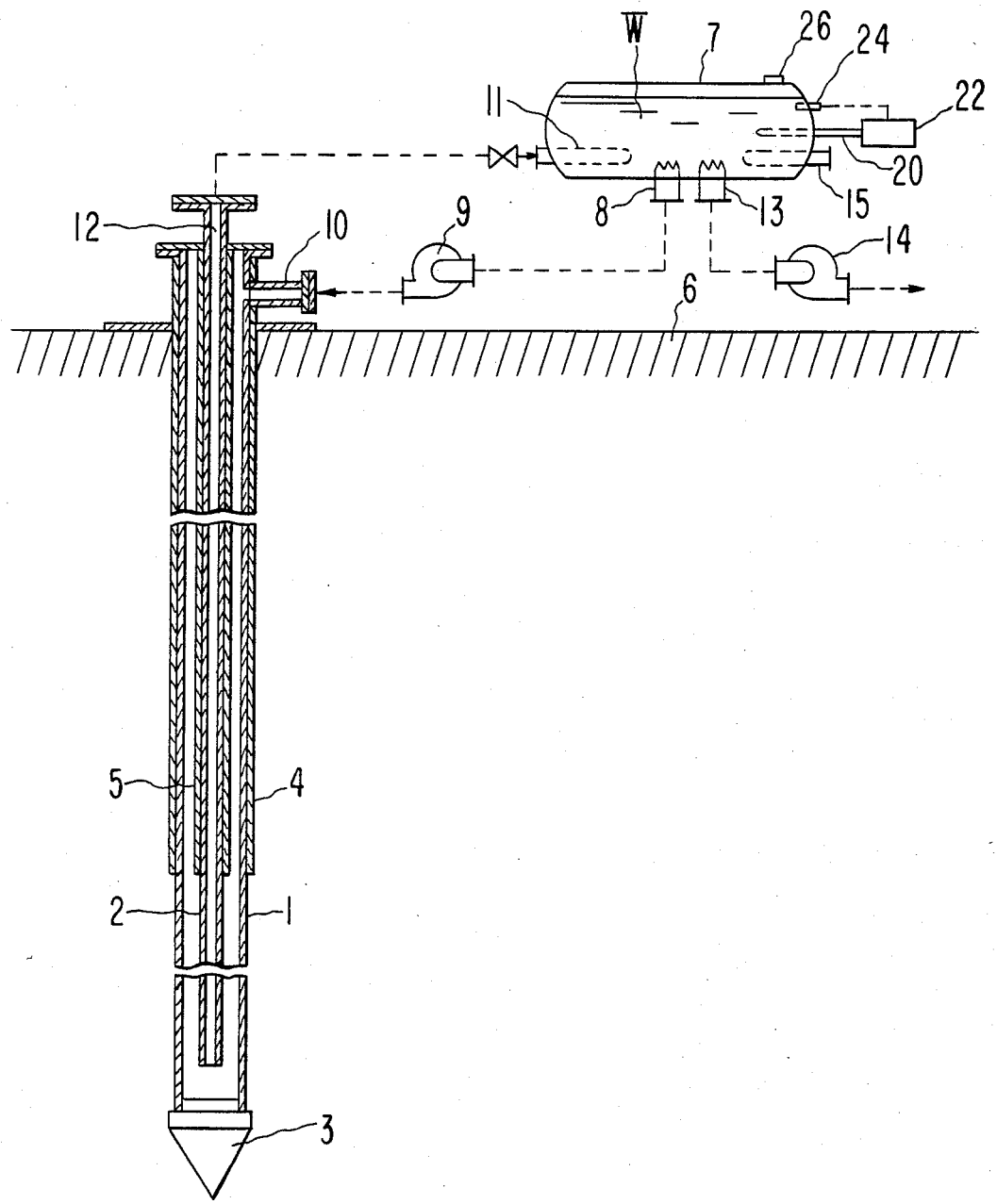

GEOTHERMAL ENERGY CONVERSION SYSTEM

This is a continuation-in-part patent application of application Ser. No. 213,293, filed Dec. 5, 1980, now abandoned, which was a continuation of application Ser. No. 946,977, filed Sept. 29, 1978, now abandoned.

This invention relates to an apparatus and a method for utilizing terrestrial heat.

BACKGROUND OF THE INVENTION

Geothermal generation of electricity can be cited as a typical example of the utilization of subterranean heat. Existing methods of generation of electricity of this type include those in which natural steam heated by subterranean heat sources and emitted from underground is used, those in which hot water is emitted from underground or pumped from underground is used, and those in which steam of other working fluids is produced by natural steam or hot water emitted or pumped up from the earth as previously indicated. However, in all these methods, the natural steam and hot water is kept entirely at the earth's surface, for which reason, as it is used up, the steam must be discharged into the ground or the water must be discharged into rivers or ponds. However, natural steam and hot water of this kind contain harmful constituents and for this reason, pollution of the environment cannot be avoided when steam or water of this kind is discharged. Pipelines can be used to carry natural steam and hot water that has been brought to the earth's surface to the required location, or they can be introduced into a heat exchange apparatus. However, when pipelines or heat exchange apparatus of this kind are damaged, the natural steam and hot water may be dispersed in all directions, as the result of which pollution of the environment may occur.

SUMMARY OF THE INVENTION

This invention has as its objective the effective utilization of subterranean heat sources entirely without bringing natural gases and heat sources to the earth's surface.

In accordance with this invention, a pipe structure, such as a pair of pipes for the purpose of circulation, is buried in the earth. The two pipes are constructed so that water or other liquid from a tank adjacent to the surface of the earth flows underground through one of the pipes to a region of subterranean heat and circulates to the earth's surface again via the other pipe, in which process of circulation through the two pipes the water is heated by the subterranean heat. The heat energy of the water that has been brought to the earth's surface, i.e., the high temperature water, is received in the tank and transferred to other water or to other suitable working fluids by means of a suitable heat exchange apparatus. After having passed through the heat exchange apparatus, the high temperature water is returned to the tank and again circulated underground through the other pipe. By this method, the subterranean heat source can be utilized in unaltered form without introducing subterranean steam or hot water onto the earth's surface. Consequently, the harmful constituents of the steam and hot water are not dispersed onto the earth's surface. Even if the pipes and the heat exchange apparatus are damaged, there is not problem because what flows out is high temperature water and not natural steam and hot water as described previously.

An operational embodiment of the apparatus of this invention is illustrated on the basis of single FIGURE of the drawing.

A pair of pipes, 1 and 2, for the purpose of circulation of a liquid, such as water, are constructed so that they are in fluid communication with each other at their lower ends. Pipes 1 and 2 form a double pipe structure. However, a structure in which each pipe is inserted into another protective pipe is preferable. Pipe 1 has a digging head on its lower end, while 4 and 5 are layers of thermal insulation materials on the outer surfaces of pipes 1 and 2, respectively. The pipes 1 and 2 are driven from the earth's surface 6 into the earth by known excavation techniques.

As is well known, subterranean temperature increases as depth increases, with rapid increases in temperature of 3° to 5° C. being exhibited about every 30 meters in the terrestrial heat zone. Therefore, high temperature regions with terrestrial heat of 250° to 300° C. can be reached by driving the pipes to shallower than 2 to 3 kilometers in the terrestrial heat zone.

An expansion tank 7 is used for regeneration. It is contructed so that its interior is maintained at a constant pressure and at a constant temperature. By this means, the high-temperature water W, which has circulated underground, is kept from boiling in the expansion tank 7. Concretely, the aforementioned high-temperature water is maintained at a high temperature, such as 250° C. and at a high pressure, such as 20 atmospheres.

A discharge outlet 8 of the expansion tank 7 is connected to the feed water inlet 10 of pipe 1 by the pump 9. Further, feed water inlet 11 of the expansion tank 7 is connected to the discharge outlet 12 of pipe 2. Consequently, when pump 9 is put into operation, the water in expansion tank 7 is fed into pipe 1 from the discharge outlet 8 through pump 9 and feed water outlet 10. The water that has been supplied in this way flows to the bottom of pipe 1, at which point it enters pipe 2, which is connected to pipe 1 at its lower end. The water then ascends, being discharged from the discharge outlet 12 at the top and then entering expansion tank 7 through feed water outlet 11. By operating pump 9, the water in expansion tank 7 is made to circulate through pipes 1 and 2 and tank 7 in a first closed loop. Because the lower parts of both pipes 1 and 2 are in the area of the terrestrial heat source or zone, the water is heated by heat exchange with such zone during the course of this circulation. Consequently, even if ordinary water is introduced into expansion tank 7 at first, it will gradually reach a high temperature as the result of the aforementioned circulation. Even if the water reaches as high a temperature as 250° C., it will not boil away because of the expansion tank 7 and a state of high-temperature water will normally be maintained. In short, high-temperature water can be obtained at the surface of the earth by using terrestrial heat in unaltered form without the necessity of introducing subterranean natural steam and hot water onto the surface of the earth.

Only the heat energy of the high-temperature water in expansion tank 7 is utilized at a location externally of and spaced from the tank, the water then being returned to expansion tank 7. For this purpose, pump 14 is connected to the other discharge outlet 13 of expansion tank 7. By operating pump 14, the high-temperature water is discharged through discharge outlet 13. The high-temperature water that has been discharged is supplied, for example, to a boiler or heat exchange apparatus and the heat energy of the high-temperature water is transferred to other water or working fluids. The water is then returned to expansion tank 7 through the other feed water outlet 15. Thus, the water can flow through a second closed loop which includes tank 7 and pump 14.

Any suitable means can be used to maintain a constant pressure and temperature in tank 7. The steam in the space above the water level in tank 7 adapts its volume exactly to the available space in the tank, always maintaining the same pressure, corresponding to the water temperature. Thus, by keeping the water temperature at a constant or near constant temperature, the pressure is maintained constant for a given volume of space above the water in the tank.

To keep the water temperature constant, an immersion heater 20 is coupled to tank 7 below the normal water level thereof for heating the water. A source 22 of electrical or other power is used to operate the heater. A thermostat 24 controls the operation of the heater 20 to heat the water in the event that the water temperature falls below a certain temperature. A thermostatic pressure valve 26 can also be used to relieve the pressure if necessary.

Another means of keeping the water at a constant temperature is a heater external to tank 7. A pump draws water out of the tank into the external heater and then back into the tank. A structure of this type is described on pages 128–135 in a text entitled "High Temperature Water Heating" by Paul L. Geiringer, John Wiley & Sons, 1963. Specifically, FIG. 4b of this text on page 134 shows an external heater coupled by a pump to a tank for keeping the water temperature in the tank at a constant value. Kent's Mechanical Engineers' Handbook, 12th Edition, published by John Wiley & Sons, Inc. (1950), in Section 17, entitled "Control Mechanisms" and Chapter 4, entitled, "Typical Regulators," shows many types of pressure regulators suitable for use with the present invention.

As described above in detail, by means of this invention, subterranean heat sources can be effectively utilized without dispersing any harmful constituents on the earth's surface. This invention can be utilized not only for geothermal generation of electricity but also for district heating and other purposes.

What is claimed is:

1. Apparatus for using subterranean heat for heating a liquid comprising: a circulation pipe having a pair of opposed ends and a length sufficient to permit the pipe to extend into the earth to a region of subterranean heat; a tank for containing a liquid to be heated, said tank adapted to be placed adjacent to the surface of the earth, said pipe being coupled at the ends thereof to the tank and being in fluid communication with the tank so that a liquid in the tank can flow through the pipe to said region and return to the tank, whereby the pipe and the tank form parts of a first closed loop, said tank having means for keeping the liquid therein at a constant pressure and temperature to keep the liquid in the tank from boiling; a pump outside the tank and coupled to the pipe for causing a circulation of liquid through the pipe and the tank; and means coupled with the tank for directing the liquid out of the tank to a heat exchanger and returning the liquid to the tank, whereby the tank and the directing means form parts of a second closed loop in which the heat energy in the liquid can be used to perform useful work.

2. Apparatus as set forth in claim 1, wherein said constant pressure is approximately 20 atmospheres and the constant temperature is approximately 250° C.

3. A method of converting subterranean heat to useful work comprising: providing a volume of a liquid in a closed region near the surface of the earth; directing the liquid from said closed region into the earth to a region of subterranean heat whereby the liquid is heated; returning the heated liquid to said closed region after it has been heated at said subterranean region; keeping the closed region at a constant pressure and temperature to keep the liquid in the closed region from boiling; directing the heated liquid from said closed region and in heat exchange relationship to a zone spaced from said closed region; and returning the liquid from said zone to said closed region.

4. A method as set forth in claim 3, wherein said constant pressure is approximately 20 atmospheres and said constant temperature is approximately 250° C.

* * * * *